(No Model.)
E. WESTON.
ELECTRICAL MEASURING INSTRUMENT.
No. 480,895. Patented Aug. 16, 1892.
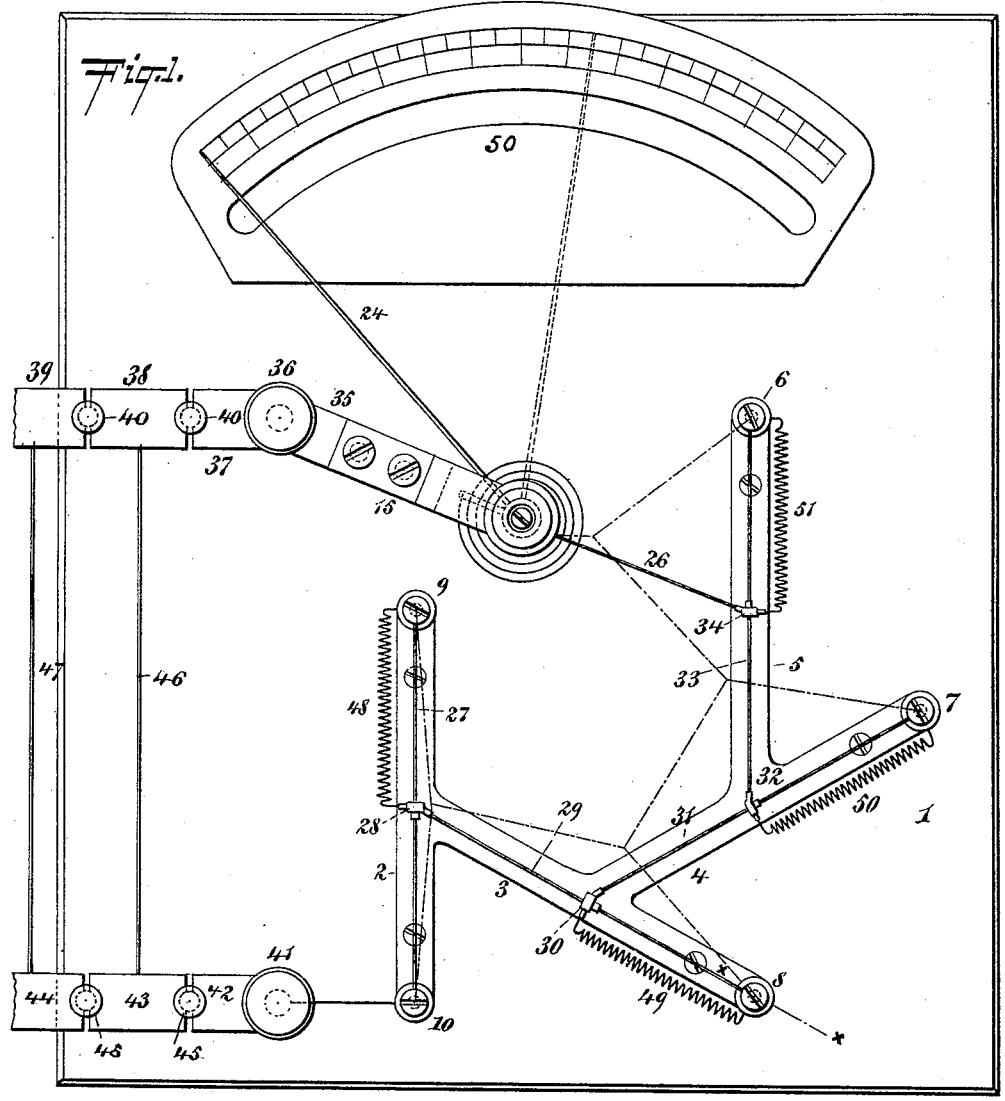
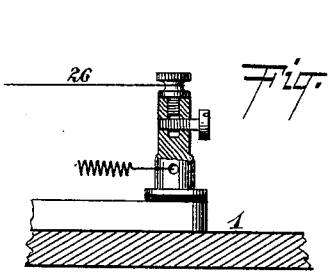
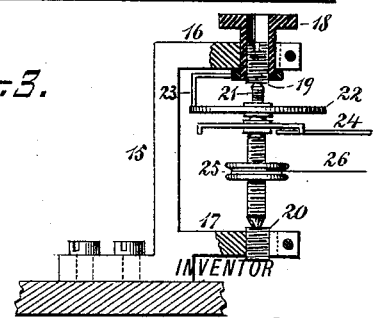
WITNESSES:
Gustave Dieterich
H. R. Moller
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 480,895, dated August 16, 1892.

Application filed January 14, 1892. Serial No. 418,099. (No model.)

*To all whom it may concern:*

Be it known that I, EDWARD WESTON, of Newark, Essex county, New Jersey, have invented a new and useful Improvement in Electrical Measuring-Instruments, of which the following is a specification.

In another application for Letters Patent, Serial No. 418,100, filed simultaneously herewith by me, I have fully set forth a new principle which I propose to apply to measuring-instruments, and more particularly those for measuring differences of potential, &c., in electric circuits. This principle I have defined, broadly, as follows: first, to cause in a body extended between two points and subjected to strain applied at an angle to the longitudinal direction of said body an elongation or expansion, whereby said strain is enabled to cause a point on said body to move to a new position, the longitudinal extent of which movement is greater than the elongation or expansion of said body, and, second, to connect a second flexible body to said point on said first body and to an abutment and to subject said second body to a strain angularly applied, whereby when said point of attachment or movable abutment is moved toward the fixed abutment the point of application of said strain to said second body shall traverse a distance greater in extent than that traversed by said movable abutment.

My present invention is an electrical measuring-instrument embodying the aforesaid principle and carrying the same into practical effect in mechanism especially adapted for use in the measurement of current strength, or, in other words, as an ammeter.

In the accompanying drawings, Figure 1 is a plan view of the instrument. Fig. 2 is a section on the line X X of Fig. 1, and Fig. 3 is an elevation and partial sectional view of the bracket supporting the vertical arbor and index.

Similar numbers of reference indicate like parts.

1 is the base-board of the instrument.

2, 3, 4, and 5 are metallic plates branching one from the other and fastened to said base-board.

At 6 is a binding-post. (Shown in section in Fig. 2.) Said post is insulated in any suitable way from its supporting-plate. Similar binding-posts 7 and 8 are disposed at the ends of the plate 3 and 4, and like binding-posts, as 9 and 10, are arranged at each end of the plate 2.

15 is a bracket fastened upon the base-plate 1 and having two arms 16 and 17. In the arm 16 is a hollow sleeve 18, within which is a screw pivot-step 19. A similar pivot-step 20 is received in the arm 17. Between the steps 19 and 20 is pivoted the arbor 21. This arbor carries a coiled spring 22, one end of which is fastened to said arbor and the other end to a bent arm 23, which is secured to the sleeve 18. By rotating the sleeve 18 the spring 22 can be loosened or tightened, as desired, and thus its tendency to rotate the pivot-shaft 21 may be regulated. Also supported on the pivot-shaft 21 is an index or pointer 24, which extends over a scale 25. Also pivoted upon the shaft 21 is a roller 25, to which is secured a flexible cord or wire 26. Between the binding-posts 9 and 10 there extends a thin flexible band of metal 27, secured to the central part of which is a link 28. The link 28 is insulated from the band 27. Extending from the link 28 to the binding-post 8 is another metal band 29, similar to 27, and this band carries a link 30, similar to link 28. Extending from link 30 to binding-post 7 is another flexible band 31, similar to band 27, and this carries a link 32, also similar to link 28. Extending from link 32 to binding-post 6 is a flexible band 33, also similar to band 27, and this band 33 carries a link 34, similar to link 28. The flexible band 26 extends from the link 34 to the roller 25 on the shaft 21, as stated. Communicating with the bracket 15 by any suitable metal plate, as 35, is a binding-post 36. Binding-post 36 communicates with the metal plate 37, adjacent to which are other metal plates, as 38 39. Between the plates 38 and 39 may be inserted plugs 40 at will. Connected to the binding-post 10 is a binding-post 41, which in turn communicates with metal plates, as 42 43 44, between which may be inserted plugs 45. Extending between the plates 38 and 43 is a band or wire 46, and extending between the plates 39 and 44 is a band or wire 47. Extending from the binding-post 9 to the link 28 is a wire 48. Similar wires 49 50 51 extend from the links 30 32 33, respectively, to the binding-posts 8 7 6. The circuit in the instrument is then as follows: from the binding-post 41 to binding-post 10, through the strip 27, to binding-post 9, to wire 48, to strip 29, to binding-post 8, to wire 49, to link 30, to wire 31, to binding-post 7, to wire 50, to link 32, to wire 33, to binding-post 6, wire 51, link 34, wire 26, bracket 15, and binding-post 36, or vice versa. The wires 46 and 47 are obviously in shunt with the binding-posts 36 and 41.

The operation of the instrument is as follows: When the strip 27 is traversed by a current, it expands or elongates. It is, however, subjected to a strain applied at an angle to its length by the strip 29, which is fastened to the link 28. As a consequence, the point of attachment of the strip 29 will be drawn to one side and the strip 27 will take a position substantially as shown by dotted lines in Fig. 1. The extent of lateral displacement of said point of attachment is always considerably greater than the extent of elongation of the strip. By reason of this displacement of the point of attachment of the strip 29 one abutment of that strip necessarily moves nearer to the fixed abutment 8 of that strip, and at the same time the strip 29 is also expanded by the passage of the current through it; but the strip 29 is under strain applied at an angle to its length by the strip 31. Consequently the link 30 or point of attachment of the strip 31 to the strip 29 will be moved laterally, and the extent of movement of said link will be very much greater than the extent of displacement of the movable abutment of the strip 29 plus the expansion of said strip, and therefore the strip 29 will take a position indicated by the dotted lines. The same thing happens in the case of strips 31 and 34, so that finally I produce at the strip 33 a very large lateral or angular movement of the point of attachment of the strip 26. The extent of this lateral or angular movement of the said point of attachment of the strip 26 determines the extent of rotation of the pivot-shaft 21, due to the torque of the spring 22 thereupon. As the index 24 is fastened to said shaft, it follows that the index will be moved by the rotation of said shaft over its scale 50. Now, as the expansion of the strips 27 29, &c., bears a relation to the strength of the current traversing them it follows that the scale 50 may be laid off in ampéres and the current strength therefore read directly from it.

In my present apparatus I have shown employed both a series of strips 27 29, &c., and an arrangement of wires 46 and 47, in shunt with the binding-posts 36 and 41. Except for purposes of measuring currents of very high strength, it is not probable that in practice the use both of strips such as 27 and 29 and the shunts 46 and 47 will be necessary; or, in other words, I may modify the arrangement of the instrument to suit the various conditions. Thus I may make the wires 46 and 47 in the form of strips or bands, so as to divert the greater part of the current from the series of strips 27 29, &c.; and in this case I may make the parts 27 29, &c., of thin metallic wire, instead of in the form of metal strips. I may increase the numbers of the wires or strips 46 or 47, so that by suitable adjustment of the plugs 40 and 45 I may throw one or more of said strips or wires into shunt; or I may leave out the shunt-circuit altogether and make the wires 27 29, &c., as I have shown them, in the form of metallic strips and cause them to conduct directly a current of high strength. The electrical workman will readily understand such modifications in construction as I have noted without further detailed description.

The great advantage of the apparatus, apart from its obvious simplicity, is its extreme sensitiveness coupled with the fact that for very slight changes in current strength very large index deflections are produced. Therefore measurements may be made of small fractions with great accuracy.

It is to be understood that a series of wires extended parallel one to the other is regarded by me as the equivalent of a metal band or strip.

I claim—

1. A flexible body of conducting material extending between abutments and in electrical main circuit, a means of applying strain at an angle to said body at a point thereon between said abutments, and an index or pointer and scale, the said index being controlled by the displacement of said point, due to said strain when said body is traversed by an electric current, in combination with a shunt between the terminals of said main circuit.

2. A flexible body of conducting material extending between abutments and in electrical main circuit, a means of applying strain at an angle to said body at a point thereon between said abutments, and an index or pointer and scale, the said index being controlled by the displacement of said point, due to said strain when said body is traversed by an electric current, in combination with a variable shunt between the terminals of said main circuit.

3. A strip or band of conducting material extending between abutments, a means of applying strain at an angle to said body at a point thereon between said abutments, and an index or pointer and a scale, the said index being controlled by the displacement of said point, due to said strain when said body is traversed by an electric current, in combination with a variable resistance in multiple-arc connection with said strip or band.

4. In an electrical measuring-instrument containing a series of flexible conductors in circuit and connected one to the other, substantially as herein described, a series of plates, as 37 38 39 and 42 43 44, connecting with the circuit-terminals, conductors, as 46 and 47, extending between plates, as 38 and 43 and 39 and 44, and plugs, as 40 and 45, for establishing electrical connection between said plates.

EDWARD WESTON.

Witnesses:
R. C. FESSENDEN,
H. R. MOLLER.